United States Patent [19]

Pinaire et al.

[11] 3,997,938
[45] Dec. 21, 1976

[54] DUAL WHEEL CASTER ASSEMBLY

[75] Inventors: Lon W. Pinaire, Prospect, Ky.;
Robert H. Godwin; John M. Freeman, both of Evansville, Ind.

[73] Assignee: Bliss & Laughlin Industries Inc., Oak Brook, Ill.

[22] Filed: Aug. 25, 1975

[21] Appl. No.: 607,109

[52] U.S. Cl. .................................. 16/45; 16/47
[51] Int. Cl.² ..................................... B60B 33/00
[58] Field of Search .......... 16/45, 46, 47, 48, 18 R, 16/18 CG; D8/226; 301/108 A, 37 P, 37 R

[56] References Cited

UNITED STATES PATENTS

| | | | |
|---|---|---|---|
| 630,696 | 8/1899 | Higgins et al. | 16/45 |
| 1,385,947 | 7/1921 | Kalberer et al. | 16/18 R |
| 3,040,370 | 6/1962 | Ford | 16/47 |
| 3,486,185 | 12/1969 | Lange | 16/18 R |
| 3,492,055 | 1/1970 | Frankland | 16/45 |
| 3,822,437 | 7/1974 | Screen | 16/45 |

FOREIGN PATENTS OR APPLICATIONS 1,168,462  9/1958  France ........................ 16/47

*Primary Examiner*—Werner H. Schroeder
*Assistant Examiner*—Conrad L. Berman
*Attorney, Agent, or Firm*—Woodard, Weikart, Emhardt & Naughton

[57] ABSTRACT

A caster has a horn of semi-circular configuration about an axle receiving apertured boss, a web extending radially outwardly from the boss to a semi-cylindrical flange and a pair of wheels, one on each side of the horn, the tread of the wheels being flush with the outer cylindrical surface of the flange. Hub shields are mounted on the wheels in such manner as to avoid load transmission to the shields, yet accommodating a variety of appearance features, ease of installation and reliable retention of the shields in place of the wheels.

16 Claims, 7 Drawing Figures

DUAL WHEEL CASTER ASSEMBLY

BACKGROUND OF THE INVENTION

1. Field of the Invention

This invention relates generally to casters, and more particularly to casters of the type useful on carpeted surfaces and yet having decorative features.

2. Description of the Prior Art

The need for casters for carpeted surfaces has increased significantly in recent years. Typically a caster for use on carpeted surfaces may be a large ball-type caster but, for design, performance and economical consideration, other approaches have been attempted. One approach is to provide a two wheeled caster. An example is shown and described in U.S. Pat. No. 3,894,310 issued July 15, 1975 and one or more of the references cited therein. The difficulty in prior art carpet casters has been that of obtaining good performance characteristics, appearance, and yet doing so economically. The present invention is an answer to the problem of prior art casters.

SUMMARY OF THE INVENTION

Described briefly, in a typical embodiment of the present invention, a dual wheel caster has a pair of wheels on each side of a horn, and snap-in hub shields which are so-mounted as to avoid transmission of wheel loads to the hub shields. The horn structure enables utilization of wheels of the maximum diameter, while providing adequate structural strength and good appearance.

DESCRIPTION OF THE PREFERRED EMBODIMENT

Figure 1:
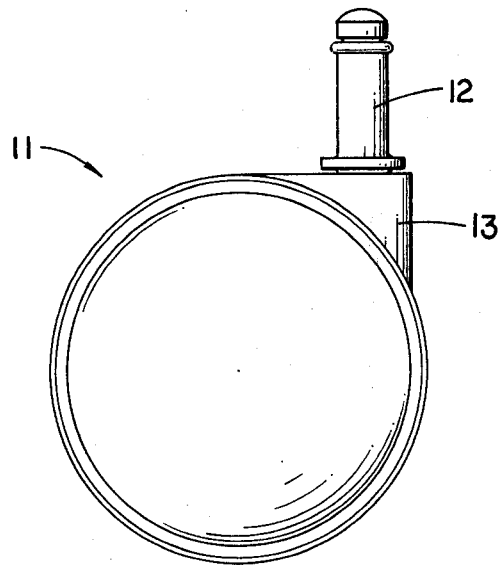
FIG. 1 is a side elevational view of a dual wheeled caster assembly according to a typical embodiment of the present invention.
Figure 2:
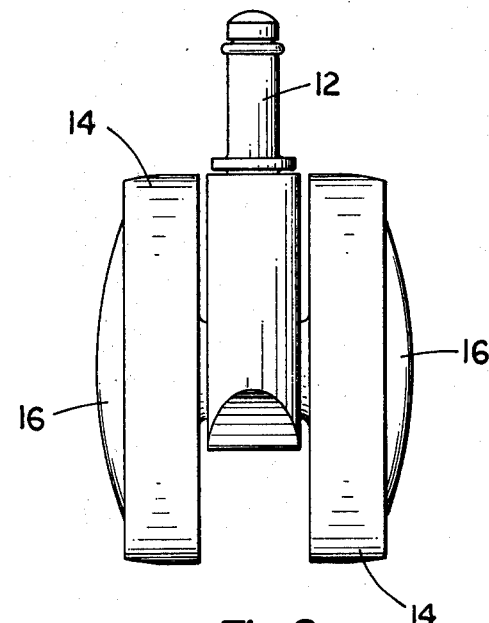
FIG. 2 is a front view thereof.

Referring now to the drawings in detail, the caster assembly 11 includes a stem 12, horn 13, and wheels 14. Each of the wheels has a hub shield 16 thereon.

Figure 3:
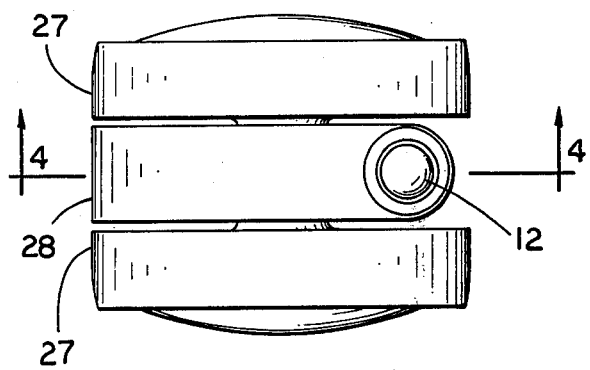
FIG. 3 is a top plan view thereof.
Figure 6:
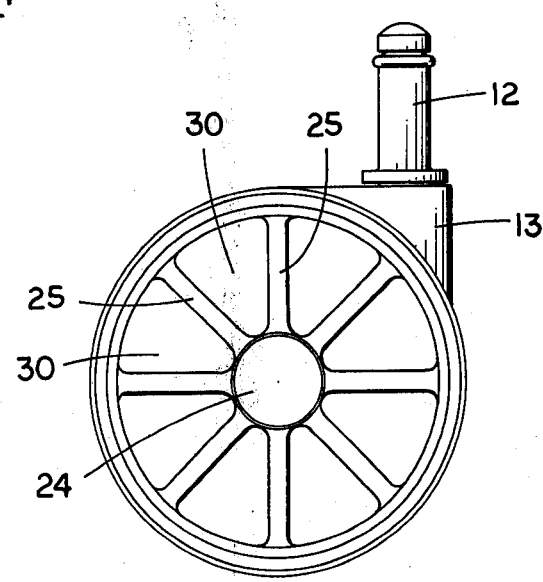
FIG. 6 is a view similar to FIG. 1 but showing a caster wheel with the hub shield removed.
Figure 4:
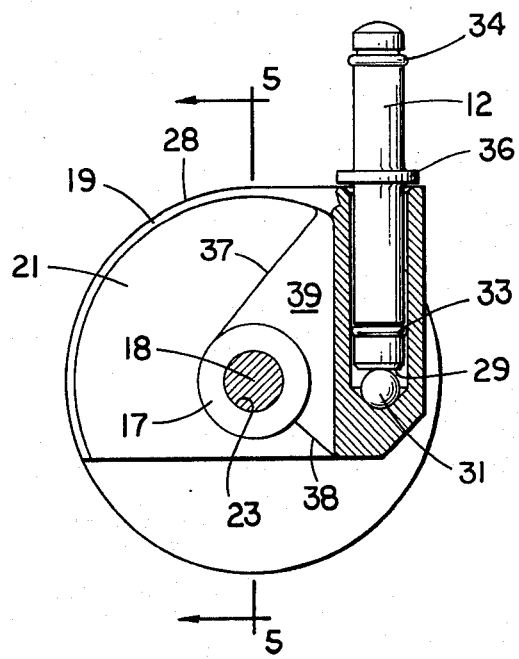
FIG. 4 is a section therethrough taken at line 4—4 in FIG. 3 and viewed in the direction of the arrows.
Figure 5:
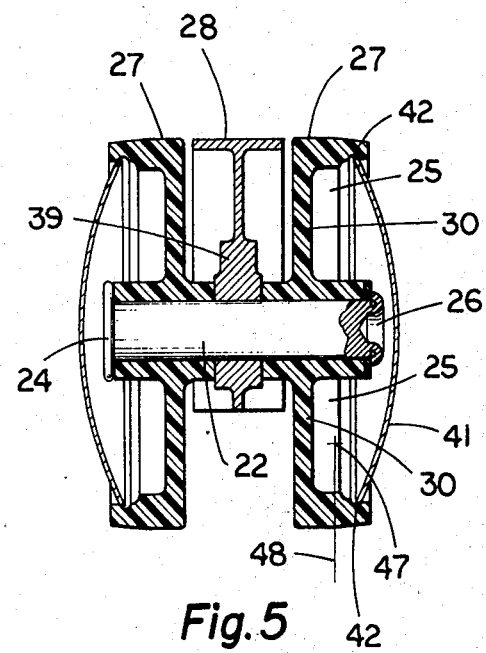
FIG. 5 is a section therethrough taken at line 5—5 in FIG. 4 and viewed in the direction of the arrows.

Comparison of FIGS. 3, 4, and 5 shows the horn includes an axle boss 17 with center at 18, a semi-cylindrical flange 19 centered at 18, and a web 21 extending from the boss 17 to the flange 19. The axle 22 is received through the bore 23 in the axle boss and has wheels 14 mounted thereto, the axle actually being a rivet with the head 24 at the hub of one wheel, and the other end being swaged at 26 to retain the other wheel in place. The horn is typically die-cast metal, while the wheels are nylon. Other materials also may be used. Circularly spaced ribs or spokes 25 extend from the wheel hubs to the rims, with wheel webs 30 between the spokes providing a uniform smooth inside face of each wheel from its hub to its tread.

The treads 27 of the wheels are flush with the outer cylindrical surface 28 of the flange and thereby can be made the maximum diameter for the greatest facility of rolling on a carpeted surface. Also the surface of the flange can be made of a texture and material or color compatible with that of the wheels if desired to provide a unitary and homogeneous appearance as is apparent in FIG. 3, for example.

The caster stem is received in the stem socket and the lower end 29 thereof is supported by a ball 31 disposed in the bottom of the socket and which trasmits the vertical thrust load between the caster horn and the stem. The stem is retained in the bore by a friction ring 33 in a groove in the stem, and a similar friction ring 34 is provided in a groove near the upper end of the stem for reception in a socket on a piece of furniture or the like. The flange 36 immediately above the caster horn does not transmit any thrust loads as they are taken entirely on the ball at the bottom, and thus free swiveling is provided.

As can be seen by reference to FIGS. 4 and 5, the cross section thickness of the web from the stem socket rearward to the lines 37 and 38 is greater than elsewhere in the caster horn web to provide a sort of gusset portion 39, this thickness being approximately ¼ inch in contrast to the normal thickness elsewhere in the web which is approximately 1/16 inch. The thickness of the boss at surface 17 of the boss is approximately 5/16 inch. These deimensions are given as examples to show differences in material thickness in different areas, to maximize strength, yet minimize use of material in the horn.

Figure 7:
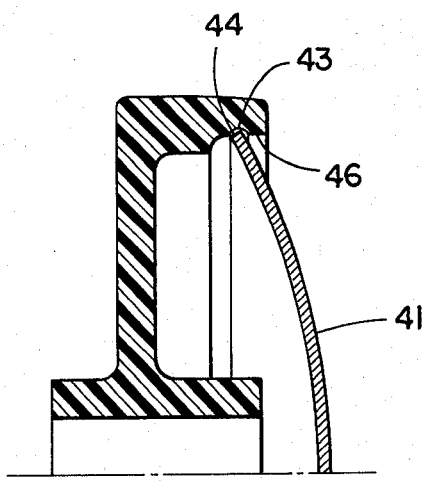
FIG. 7 is an enlarged section showing details of the mounting of the hub shield in the wheel rim.

According to an important feature of the invention, the caster wheels are provided with shields for the hubs. An example is best shown in FIGS. 5 and 7, where the hub shield 41 is shown as a generally spherical shell received in a circumferential groove 42 in the wheel rim. The groove diameter at its maximum point 43, for example, is typically slightly greater than the free maximum diameter of the shield itself to the outer edge 44 thereof. However, the diameter of the entrance to the groove 43 at the edge 46 of the rim of the wheel is slightly less than the maximum diameter of the free, unloaded hub shield. The reason for this is the fact that it is desirable, according to one of the features of this invention, to avoid loading the hub shield by normal deformation of the wheel of the caster under load as it rolls. In this way, the hub shield can be made of a comparatively fragile material or have a finish thereon which is somewhat brittle but desirable for particular esthetic effect, and yet have it avoid destruction or damage during the use of the caster. The other particular advantage of this type of construction is the fact that a variety of different kinds and designs of hub shields can be employed with the caster to provide any particular contour or surface finish desired, without detracting from the basic structural design of the caster assembly. Thus it is preferable that the hub shield be of sufficient durability to be snapped into place in the groove 42 and yet float in the groove so it is not thereafter loaded by slight normal deformations of the wheel as it rolls. Of course, where the structure and materials and finish as employed in a particular hub shield are not sensitive to destruction or deterioration due to wheel deformaton, a snug fit of the shield in groove 42 could be employed. An additional feature of the construction according to the invention is the fact that hub shields can readily be assembled to the caster wheels at the point of purchase, in accordance with a particular customer's desires for appearance and color of the hub shield, for example, without the necessity of any special fastening or installation tools and without any visible fastening devices after the asembly is completed.

While the invention has been disclosed as employing a friction ring on the caster stem, it could also be retained in the stem socket by other means, such as staking, for example. Also, other variations will be recognized within the scope of the invention. By way of further example, the overall width of the flange at its surface 28 may be five eighths of an inch. The overall width of the tread of the 2½ inch diameter wheel may be ½ inches, with a portion from the center of the tread outward being curved at a 2 inch radius from points in a circle about the axis 18 in a plane bisecting the tread, such as point 47 in plane 48 in FIG. 5, for example.

From the foregoing description, it should be apparent that the present invention provides a number of advantages, including the utilization of minimal material requirements in the horn, while maintaining structural and functional integrity. In addition, the features of the horn, shaft and wheel combination, permit easy assembly. Also the design of the wheel and associated shield permits easy assembly while eliminating any visual display of fastening devices. In addition, the hub shield as employed according to the present invention, permits ready variation of the esthetic quality of the caster, including various surface textures and contours, finishes and materials. One such finish could be a brittle lacquer or a ceramic. In addition, the complete caster, except for the hub shield, can be assembled in the factory and retained in inventory at the factory or point of sale, for ready assembly of the individual hub shield desired, for quick delivery from the factory, distributor or retailer. The combination also accommodates not only a wide variety of wheel and hub shield esthetic configurations but also will accommodate a wide variety of functional requirements including hard tread on carpet, soft tread on hard floors, or an all purpose tread, without sacrificing esthetic qualities. As mentioned above, the attachment of the hub shield to the wheel is such as to permit quick and easy assembly without special tools and yet allow the hub shield to float within the wheel and avoid transmission of load deflection of the wheel from the wheel into the hub, thereby eliminating the possibility of resultant loading from damaging the hub shield in such instances where the hub shield is made of a material or finishes which are particularly pleasing esthetically, but have little structural strength.

What is claimed is:

1. A dual wheel caster comprising:
a horn having an axle boss, a semi-circular web extending radially outward therefrom and a semi-circular flange defining the semi-circular outer limit of the web, said flange having an axis common with a center of said axle boss;
an axle mounted directly to said axle boss and extending through said axle boss; and
a pair of wheels mounted on said axle, one wheel being on each side of said web and flange, each wheel having a tread;
each of said wheels including a hub and a rim, and each wheel having a hub shield covering said hub, said shield having an outer edge received in said rim and supported therein with a radial space between the edge and an edge facing portion of the rim to avoid load transmission to said shield as said wheel rotates.

2. The caster of claim 1 wherein:
said horn includes a swivel having a swivel axis:
said web and swivel axis being in a common plane;
said axle being horizontally offset behind said swivel axis; and
the outermost circular surface of said flange being flush with a portion of the tread of each of said wheels.

3. The caster of claim 1 wherein:
said flange has a semicylindrical outer face flush with the tread of each wheel and spanning the space between the treads of the two wheels.

4. The caster of claim 1 wherein:
said rim has a groove therein receiving the edge of said shield and retaining said shield on said wheel.

5. The caster of claim 4 wherein:
said groove is annular, opens radially inward toward said axle, and has a lip of an inside diameter slightly less than the greatest diameter of said shield, said shield being fittable to said wheel by snapping the shield into the groove.

6. The caster of claim 5 wherein:
the maximum diameter of said groove is greater than the greatest diameter of said shield whereby said shield floats in said groove.

7. The caster of claim 6 wherein each wheel has a plurality of circularly spaced ribs extending radially from said hub to said rim.

8. The caster of claim 3 wherein:
said horn is metal and said wheels are plastic.

9. The caster of claim 8 wherein:
said shield is of a decorative material.

10. The caster of claim 9 wherein:
the decorative surface of said shield is brittle.

11. The caster of claim 1 and further comprising:
a rivet extending through each of said wheels and said axle boss and serving as said axle, supporting the axle boss on said wheels.

12. The caster of claim 11 and further comprising:
a circular groove in each of said wheels; and
a hub shield for each of said wheels and retained in said groove therefor.

13. The caster of claim 12 wherein:
the hub shield fits loosely enough in said groove to accommodate load deflection of said wheel under operating loads while rolling, without bearing any portion of said loads.

14. The caster of claim 12 wherein the fit between the hub shield and wheel is a snap-in floating fit.

15. A dual wheel caster comprising:
a horn having swivel means and a pair of wheels thereon; and
a wheel hub shield mounted to at least one of said wheels on the face of said wheel opposite said horn and rotatable with said wheel, said shield covering a major portion of the face of said wheel,
each of said wheels having a tread and rim adjacent the tread, the rim of each wheel having a radially inward facing groove therein, and a wheel hub shield having a greater diametrical distance across outer edge portions than the diametrical distance across inner edge portions of said groove at the entrance to said groove whereby each of said shields is retained in its respective groove after it is snapped into its respective groove.

16. The caster of claim 15 wherein:
each of said shields has a circular outer edge, the maximum diameter of said outer edge being less than the maximum diameter of said grooves, whereby said shields float in said grooves.

* * * * *